United States Patent

[11] 3,612,111

| [72] | Inventor | Heinrich F. Meyer<br>Liverpool, N.Y. |
|---|---|---|
| [21] | Appl. No. | 861,970 |
| [22] | Filed | Sept. 29, 1969 |
| [45] | Patented | Oct. 12, 1971 |
| [73] | Assignee | General Electric Company |

[54] WIRE CUTTING AND STRIPPING APPARATUS
6 Claims, 4 Drawing Figs.

[52] U.S. Cl.................................................. 140/1,
81/9.51
[51] Int. Cl....................................................... B21f 11/00,
B21f 21/00, H02g 1/12
[50] Field of Search........................................... 29/203 R;
81/9.51; 83/111; 140/1

[56] References Cited
UNITED STATES PATENTS

| 1,831,115 | 11/1931 | Holmes .......................... | 81/9.51 |
|---|---|---|---|
| 2,680,394 | 6/1954 | Andren ........................ | 81/9.51 |
| 2,884,825 | 5/1959 | Eubanks........................ | 81/9.51 |
| 2,886,995 | 5/1959 | Bach et al. ..................... | 81/9.51 |
| 2,920,513 | 1/1960 | Baird et al. .................... | 81/9.51 |
| 3,309,948 | 3/1967 | Falken........................... | 81/9.51 |
| 3,316,781 | 5/1967 | Bignell et al................... | 81/9.51 |
| 3,364,801 | 1/1968 | Johnston ....................... | 81/9.51 |
| 3,368,428 | 2/1968 | Gudmestad .................. | 81/9.51 |
| 3,385,139 | 5/1968 | Lloyd............................ | 81/9.51 |

*Primary Examiner*—Charles W. Lanham
*Assistant Examiner*—E. M. Combs
*Attorneys*—Carl W. Baker, Frank L. Neuhauser, Oscar B. Waddell and Joseph B. Forman

ABSTRACT: Apparatus for cutting insulated electrical wire into connectors or leads of desired length and stripping insulation from the cut ends. The apparatus accepts both manual and automatic (N/C) settings of wire length, permits change of length setting from piece to piece at will of the operator, provides good accuracy of wire length measurement even on the first piece cut after each change in length setting, and provides a cut and strip action which avoids kinking or bending of the ends of wires as dispensed from the apparatus. To accomplish these ends the apparatus comprises a continuous belt-type transport mechanism for wire feed with protection against wire slip being afforded through pressure-loading means assuring at least line contact between the belts and wire over a substantial length thereof, photosensor means for measuring the distance of belt travel to thus accomplish accurate measurement of wire length and enable its precise control, and simplified mechanism for wire cutting and stripping and for ejection both of the wire and of the stripped insulation.

INVENTOR:
HEINRICH F. MEYER,
BY C.W. Baker
HIS ATTORNEY.

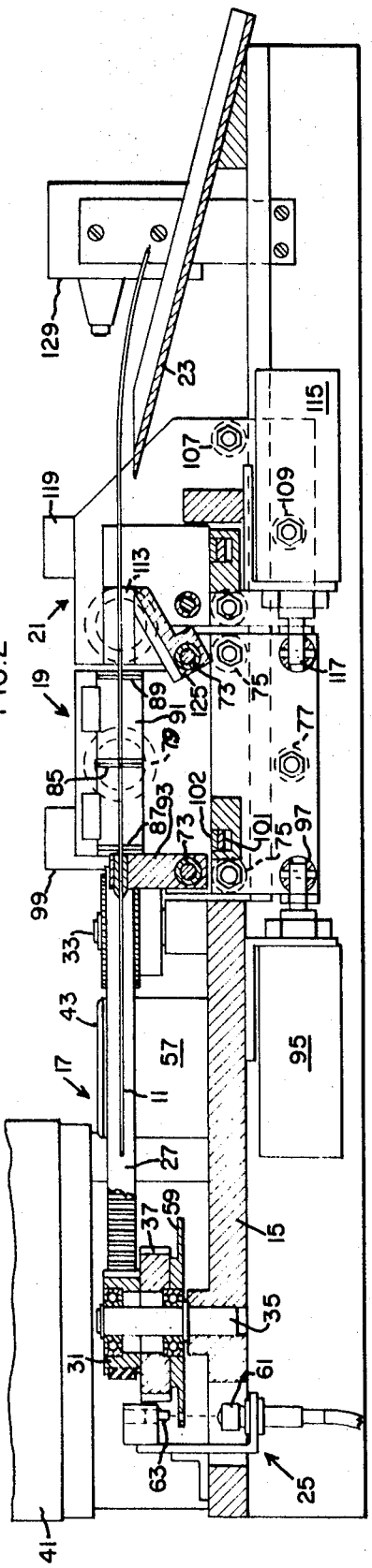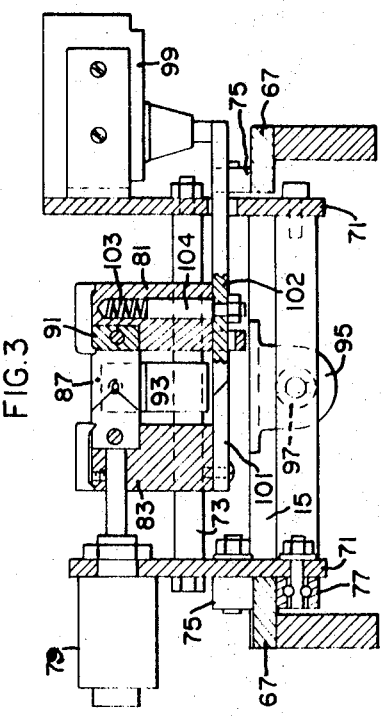

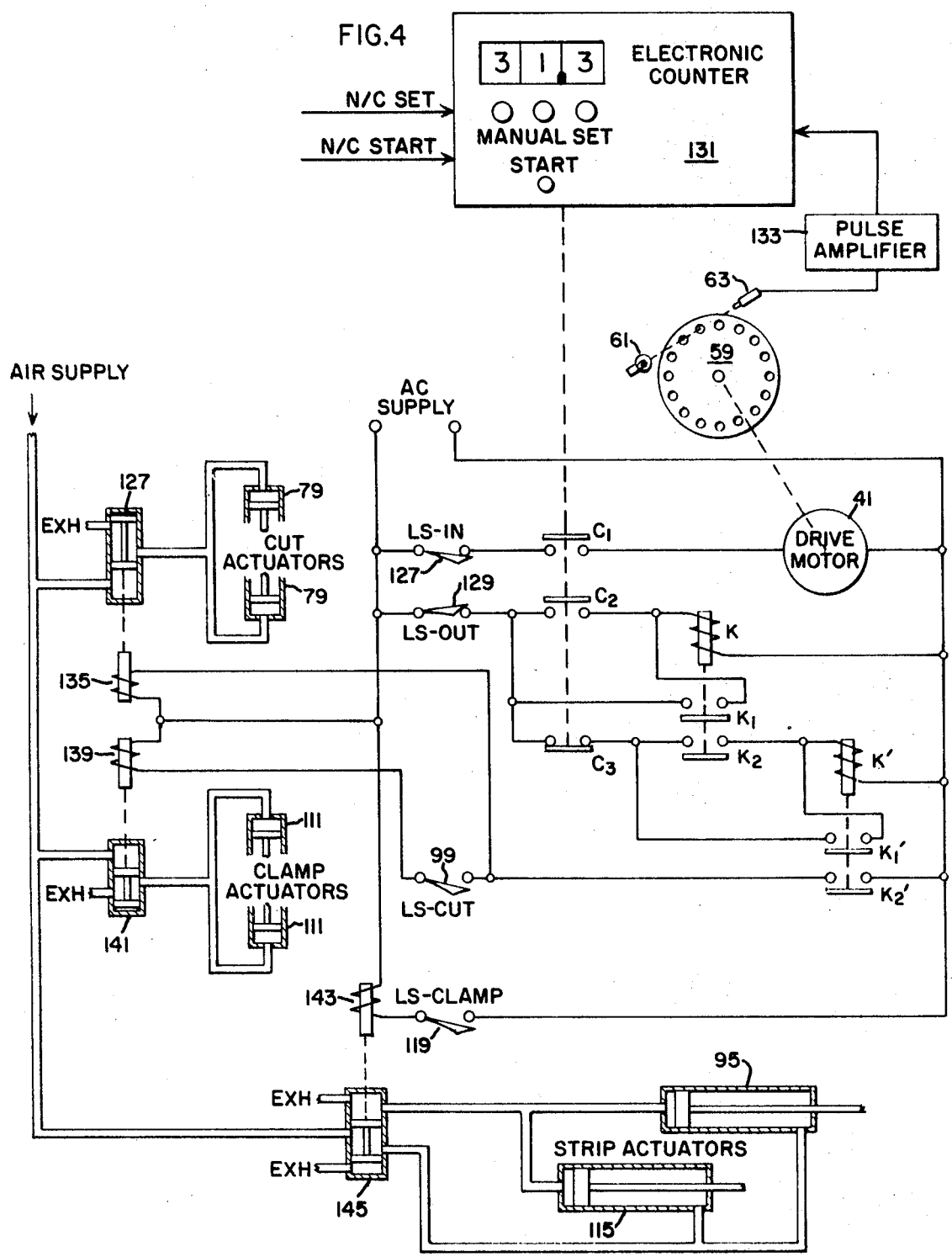

3,612,111

WIRE CUTTING AND STRIPPING APPARATUS

BACKGROUND OF THE INVENTION

The present invention relates to apparatus for preparing electrical connectors and leads from wire stock by cutting the stock to desired lengths and stripping insulation from the wire ends adjacent the cut. More specifically this invention relates to apparatus for producing electrical lead wires stripped on both ends and measured accurately to length settings which may be introduced either manually or through automatic control equipment.

The prior art, including both the patent literature and current commercial equipment offerings, comprises many and diverse machines intended for reassuring, cutting and stripping insulated electrical wire for use as leads, and a number of these machines accomplish their intended purpose in commendable manner. Generally, however, these prior devices are subject to certain limitations which tend to restrict their use particularly as dispensers of cut and stripped leads to automatic wiring machines or other numerical control (N/C) equipment in systems in which the control of lead length is dictated by a tape or other N/C input to the cutting and stripping machine. Perhaps the most troublesome problem encountered in attempting the utilization of conventional wire cutting and stripping machines using these N/C control techniques, stems from the common inability of such machines to accurately measure wire length and particularly to accurately measure the first piece of wire cut after any change in setting of the called for lead length. Since in the wiring of many types of electrical systems the required lengths of lead wires may change from connection to connection with few if any successive leads being of the same length, this problem of unreliability of first piece length accuracy can in some cases become so troublesome as to preclude the use of N/C equipment for such wiring tasks.

The present invention has as a primary objective the provision of wire cutting and stripping machines with capability to produce consistently high precision of wire length measurement and control even of the first piece cut, to do so even with wire of different diameters and with different insulation materials and thicknesses, and to do so under either manual or automatic (N/C) control. Additionally, the wire cutting and stripping apparatus of this invention is characterized by a relative simplicity of structure which affords important advantages with respect to reliability of operation and economy of manufacture. Finally it should be noted that the apparatus of the present invention utilizes many standard components such as a commercially available electronic counter for wire length measurement and commercially available timing belts for wire transport, and that the use of such standard components affords still further economies.

SUMMARY OF THE INVENTION

In brief, the wire cutting and stripping apparatus of this invention utilizes a motor-driven belt-type transport for the wire to be cut and stripped, with positive engagement between the belts and wire being assured by means which pressure load the two belts against each other over a substantial part of their length, so that as the wire is fed between the belts thus loaded together there is at least line contact between the belts and wire over a substantial length of the wire. Conveniently, the belts used may be of the conventional timing belt construction in which the inner circumferences of the belts are toothed to afford positive engagement with similarly toothed drive gears, and the two belts are urged together by stationary backup plates at least one of which is spring loaded in the direction of the other to provide he desired length of surface contact between the outer circumferences of the belts between which is fed the wire. Because of the positive engagement thus afforded between the belts and wire, belt travel may be taken as an accurate measure of the length of wire fed, and for accomplishing measurement of belt travel one of the belt drive gears also dries a measuring wheel having an apertured outer periphery interposed in the path of a light beam from a light source to a photoelectric cell. Pulses generated as the apertures alternately pass and intercept the light beam are counted by conventional electronic pulse counter means to provide a measure of the length of wire fed, and to switch off the feed motor when the desired length is achieved and at the same time to actuate the wire cut and strip mechanism.

This mechanism comprises a wire and insulation cutter blade assembly which is itself generally conventional in construction, and a wire clamp assembly which again may be generally conventional in construction. Such assemblies are mounted to cutter and ejector carriages, respectively, with both such carriages being mounted for translatory movement along the longitudinal axis of the machine. Actuator means are provided for effecting the desired movement of the carriages, that for the ejector carriage being arranged to cause its travel through a distance approximately twice the travel of the cutter carriage. With this arrangement both ends of the wire adjacent the cut may be cleanly stripped, without need for movement of any part of the stripping or ejector mechanism counter to the direction of wire feed during the stripping operation, and the kinking and bending of wire ends common to prior cutting and stripping apparatus thus avoided.

The wire cutting and stripping apparatus of this invention lends itself to pneumatic, hydraulic or electrical actuation and control; a combined pneumatic and electrical system is utilized in the preferred embodiment illustrated.

BRIEF DESCRIPTION OF THE DRAWING

The foregoing and other objects, features and advantages of the invention will become more fully apparent and the invention further understood by reference to the following detailed description when read in conjunction with the accompanying drawings, wherein:

FIG. 2 is a sectional view taken along the line 2—2 in FIG. 1;

FIG. 3 is a sectional view taken along the line 3—3 in FIG. 1; and

FIG. 4 is a schematic of the actuation and control system for the apparatus of FIG. 1, showing both the electrical control and pneumatic actuation subsystems.

DESCRIPTION OF PREFERRED EMBODIMENTS

Figure 1:
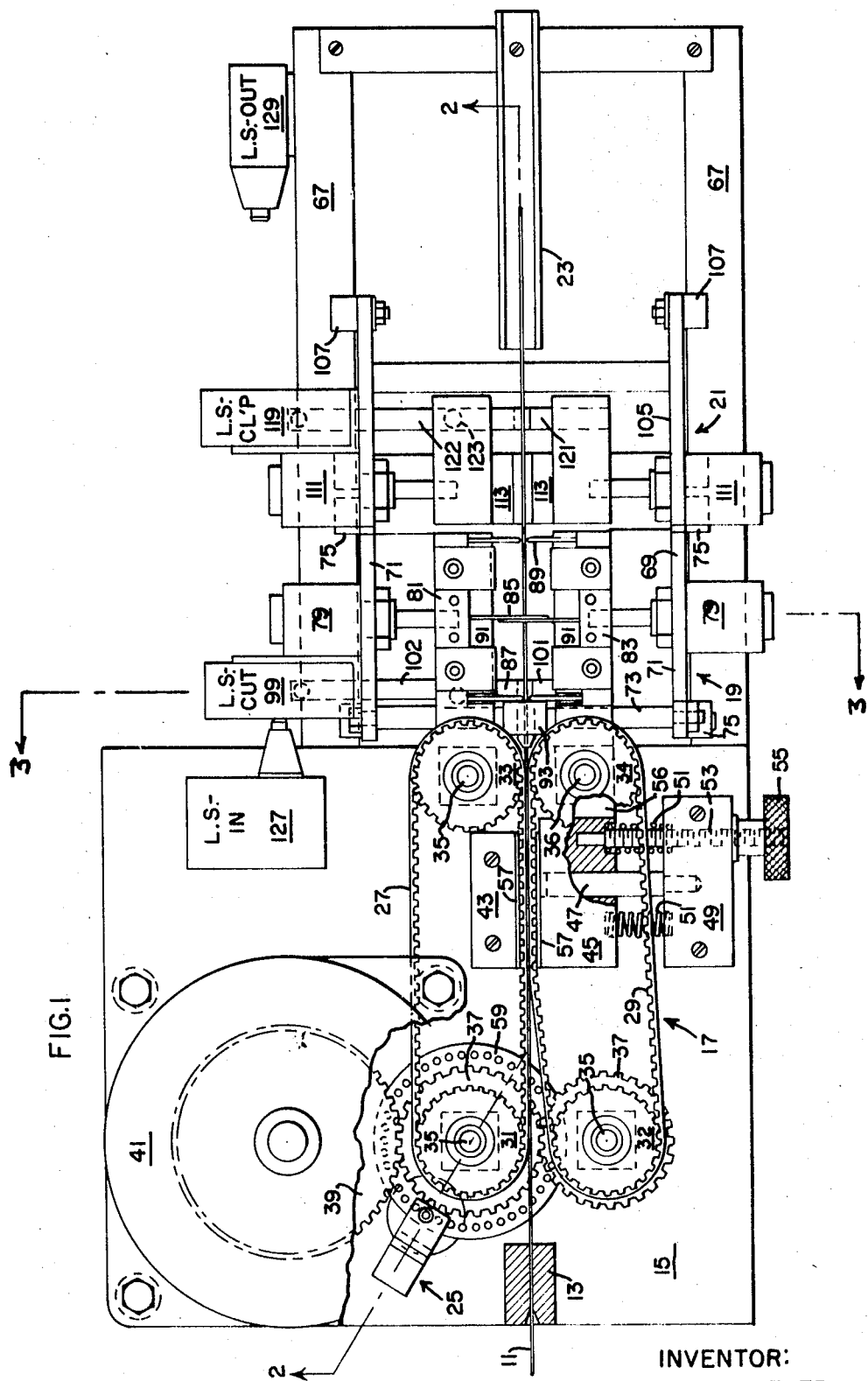
FIG. 1 is a part sectional top elevation of wire cutting and stripping apparatus in accordance with the invention.

With continued reference to the drawings, wherein like reference numerals have been used throughout to designate like elements, FIG. 1 illustrates one presently preferred embodiment of the invention utilizing pneumatic power for cutting and stripping operations and an electric motor for drive of the wire feed mechanism. The wire 11 to be processed is electrical connector wire stock with plastic, fabric or similarly removable insulation, and is supplied from any convenient source such as a free-running spool (not shown). Preferably the wire is passed through one or more conventional wire straightening devices (not shown) before feed into the wire cutting and stripping apparatus of the invention, the operation of which then is such as to preserve this initial straightness and to dispense kink-free leads ready for utilization.

The wire enters through a guide member 13 suitably affixed to the machine baseplate 15. It then passes through a wire feed assembly designated generally by reference numeral 17, next through a wire and insulation cutting assembly designated generally by reference numeral 19, and finally through a stripping and ejector assembly designated generally by reference numeral 21, the cut and stripped lead being discharged from the apparatus via a chute 23 which may be angled downwardly as shown for gravitational discharge or otherwise directed as convenient to the operator. For measuring and controlling the lengths of leads cut, a photosensor assembly designated generally by reference numeral 25 provides a pulsed output signal indicative of wire length measurement and this signal is utilized in the control system of FIG. 4 in a manner to be explained in connection with that figure.

Referring now more specifically to the wire feed assembly 17, this assembly comprises a pair of endless belts 27 and 29 which preferably are of the type commonly known as timing belts and presently widely sold particularly for automotive engine timing application. Like the conventional V-belt these timing belts comprise rubber bodies with embedded cord or wire reinforcing, but they differ from the standard V-belt in having their inner peripheries toothed similarly to gear teeth. Timing belts accordingly can be driven by or may drive conventionally toothed gears with no possibility of slippage between the belt and its driving or driven member. Each of the belts 27 and 29 is mounted to one of two driven gears 31 and 32, and to one of two idler gears 33 and 34. Each of these gears except gear 34 is freely rotatable upon a stub shaft 35 fixed to the baseplate 15 in the location shown. Gear 34 is freely rotatable also but the stub shaft 36 on which it rotates is fixed to a floating mount to be described, rather than to the baseplate 15 The two driven gears 31 and 32 are interconnected by gears 37 to assure identity of their respective movements, and the drive input to these gears is provided by gear 39 which is directly affixed to the shaft of an electric motor 41. This motor preferably is one of the commercially available stepping motors of the very low speed synchronous type in which the permanent magnet structure produces braking on deenergization of the motor. Such braking effect affords good precision of start-stop control and also holds the belts 27 and 29 against movement except when driven by energization of the motor.

To effect positive engagement of the wire with the belts 27 and 29 between which it travels, to thus ensure that measurement of belt travel will provide an accurate measure of the length of wire fed between the belts, means are provided for assuring at least line contact between the belts and wire over a substantial distance. As shown, these means comprise a backing member 43 which may be affixed to the baseplate 15 in any convenient manner as by the bolts shown, and a loading member 45 which is mounted for free sliding movement upon cylindrical stud member 47 fixed into a mounting block 49. This block 49 is bolted or otherwise suitably fixed to the baseplate 15. A pair of compression springs 51 disposed as shown between mounting block 49 and the loading member 45 resiliently urge the latter against the inner surface of belt 29 thus pressing it against the other belt 27 over the full lengths of the extended bearing surfaces constituted by the opposed faces of the loading and backing members.

While the pressure loading on the drive belts necessary to assure complete reliability of wire length measurement is so small that frictional losses and wear attributable to rubbing of the belts against members 43 and 45 are negligible, a low friction bearing surface desirably may be provided as at 57 on each of members 43 and 45 for the belts to slide against. This may take the form of a surface coating or bearing plate fabricated of a low-friction material such as nylon or the polytetrafluoroethylene composition marketed under the trade name "Teflon." The belt pressure loading and travel speeds are sufficiently low that belt wear is not troublesome even without such nylon or Teflon bearing surfaces, and their addition has been found to effectively eliminate all perceptible belt wear over long operating periods.

For facilitating initial loading of wire into the transport mechanism, means are provided for retracting the loading member 45 and simultaneously retracting the idler gear 34 previously noted as having a floating mount. The shaft 36 for this gear is carried by the loading member 45, being fixed to an extension 56 thereof, and the gear accordingly is urged toward the other idler 33 by operation of the loading springs 51. To retract the loading member and gear assembly against the force of these springs, a threaded stud 53 has one end fixed in the loading member and engages an internally threaded handwheel which may be rotated to draw the stud outwardly through the handwheel. This will retract the loading member assembly to provide clearance between the drive belts along their full lengths, for easy insertion of wire therethrough.

To provide the desired measurement of belt travel and thus of wire length, an apertured or toothed wheel 59 is fixed to one of the drive gears 37 and has its apertured peripheral portion arranged to rotate through he photosensor assembly 25. As best shown in FIG. 2, that assembly comprises a light source 61 disposed on one side of wheel 59 and a photosensor unit 63 disposed on the other side thereof, with the light beam from the source to the cell being periodically interrupted as wheel 59 rotates. The pulsed electrical signal output thus obtained from photosensor 63 is transmitted to the electrical control circuit of FIG. 4 and there utilized to derive the desired measure of wire length and for control of the drive motor 41.

Referring now to the wire and insulation cutting assembly 19, this and the stripping and ejector assembly 21 both are mounted for reciprocating movement along two track members 67 which extend parallel to the longitudinal axis of the machine. To enable such movement the cutting assembly 19 comprises a carriage 69 including two side frame members 71 held in assembled relation by spacer members 73 therebetween, and the cutter carriage 69 is mounted for translation along the tracks 67 by means of rollers 75 and 77. Rollers 75 engage the upper surface of track 67 and roller 77 the lower surface hereof, the rollers thus securing carriage 69 to the track members while permitting travel along them.

Each of the carriage frame members 71 has mounted thereto a linear actuator 79. These are pneumatic actuators each having mounted to its output member one of the wire and insulation cutter heads 81 and 83, which as shown may be generally conventional in construction comprising two wirecutter blades 85 and two sets of insulation cutter blades 87 and 89. These blades are fixed in mounting blocks 91, preferably detachably as shown, and the blocks 91 in turn are connected to the actuator output members. As will be obvious, movement of the cutter head into the position shown by the actuator 79 is effective to sever the wire 11 in the plane of the wirecutter blades 85 and to cut the insulation though not the wire in the planes of the insulation cutter blades 87 and 89.

For guidance of the wire as it is fed into the region between the cutter blade heads from the feed assembly 17, a fluid member 93 may be mounted as shown to one of the spacer members 73 and provided with a central bore through which the wire is passed. For translating the cutter carriage 69 along tracks 67, as is necessary to the stripping operation to be described, there is provided a linear actuator of pneumatic piston and cylinder type. This actuator is mounted to baseplate 15 and has its output member coupled to the carriage member 69 through a pivotal connection such as shown at 97.

The control system to be described includes a limit switch which is tripped when the cutter heads have come fully together and completed their cutting operations. This limit switch, designated the "LS-CUT" switch, is shown at 99 and as best seen in FIG. 3 is tripped when the beveled forward edge of a first camming member 101 carried by cutter head 83 is contacted by the complementarily beveled forward edge of a second camming member 102 carried by cutter head 81. This latter camming member is mounted for translatory movement perpendicular to the direction of the cutter head travel, by a stud 104 affixed to the camming member and slidable in a bore in the cutter head 81 against a loading spring 103 compressed within the bore. Thus when the beveled ends of camming members 191 and 102 come together the latter member is lifted bodily upward against spring 103 and its outer end trips the limit switch 99.

The stripping and ejector assembly 21 comprises a second carriage 105 constructed in essentially the same fashion as the cutter carriage 69 and translatable along tracks 67 on rollers 107 and 109 which likewise are similar to those of the cutter carriage. Each of the side frame members of the ejector carriage has mounted thereto a linear actuator 111 of pneumatic piston and cylinder type and each actuator output member carries a wire clamp element 113 which, when the actuator is driven inwardly, comes together with the other such element to clamp the wire firmly between their opposing faces as shown.

The stripping and ejection operation requires relative movement between this ejector carriage and the cutter carriage, and to accomplish such relative movement a linear actuator 115 is provided mounted to the ejector carriage 105 and having its output member pivotally coupled as at 117 to the cutter carriage, so that when the actuator is energized in one direction it drives the cutter and ejector carriages apart and when energized in the other direction it pulls them together into the position illustrated. The ejector carriage assembly also includes a limit switch 119, designated the "LS-CLAMP" switch, which is tripped by the clamp actuators in a manner similar to that previously described for the LS-CUT switch. Here the complementarily beveled camming members are shown at 121 and 122, and the loading spring at 123, as best seen in FIG. 1.

For directing discharge of the short lengths of insulation stripped from the wire, a chute 125 positioned as illustrated may be provided, and for directing discharge of the stripped leads the chute 23 previously mentioned may be mounted in the position illustrated or otherwise directed as appropriate to the convenience of the operator.

In operation of the cutting and stripping mechanism just described, the cutter head assemblies 81 and 83 initially are retracted by actuators 79 leaving a clear area through which the wire 11 may be advanced to measure out a lead wire of the desired length and to place the forward end of that wire above or in the the chute 23. When this measured feed is completed, he cutting head actuator 79 then is energized to drive the cutting head assemblies 81 and 83 together, severing the wire and cutting the insulation on either side of the plane of severance. The clamp actuators 111 then drive clamp elements 113 together to firmly engage the wire 11, and the stripping actuators 95 and 115 next are energized to drive both the cutter and ejector carriages to the right with respect to the main frame and to drive the ejector carriage further to the right with respect to the cutter carriage. As the cutter carriage moves to the right this strips the insulation from the end of the wire on the feed side of the apparatus, the wire there being firmly held during such stripping operation through its engagement with the feed belts 27 and 29 which now are held stationary. As the ejector carriage 105 moves on to the right with respect to the cutter carriage, the insulation is stripped from the end of the newly cut lead and this lead is transported to the right, so as to place a major portion of its length into or through the discharge chute 23. When these operations are completed the clamp actuators 111 are deenergized to release the lead through chute 23, and the stripping actuators 95 and 115 are caused to transport the cutter and ejector carriages back to their initial positions as shown, in preparation for the next operational cycle.

In addition to the two limit switches 99 and 119 previously mentioned, the control system next to be described may include two additional limit switches 127 and 129, the switch 127 being designated "LS-IN" and positioned so as to be tripped when the cutter carriage departs from its position illustrated, in which it is at the left-hand extreme of its permitted range of travel. Switch 129, designated "LS-OUT," is positioned so as to be tripped when the ejector carriage 105 reaches the right-hand extreme of its permitted range of travel, to thus signal that the stripping and ejecting operation is completed and to prepare the system for another cycle of operation.

The operating cycle will be better understood by reference to the electrical and pneumatic schematic of FIG. 4, to which reference is now made. In FIG. 4, the drive motor 41 for the wire feed is shown connected to the AC supply through two switches, one designated LS-IN which corresponds to the limit switch 127 in FIG. 1 and which is closed whenever the cutter carriage is in its "home" or extreme left-hand position, and the other being a switch $C_1$ which is controlled by an electronic pulse counter 131. This counter conveniently may be one of the many commercially available units of the kind into which any desired number may be preset, and which in response to a pulse input will count the input pulses until that number is reached and thereupon trip an electrical control switch. Preferably the counter 131 is of the type enabling either direct manual setting of the pulse count desired, or automatic setting through an electrical signal input as from N/C equipment as indicated, and providing similar flexibility with respect to the "START" input which places the control switch in its other position.

Here the pulse input to electronic cutter 131 is provided by the belt travel photosensor assembly 25 previously described, which it will be recalled comprises an apertured wheel 59 driven by the belt-drive motor with its apertures arranged to pass light between a source 61 and photocell 63. The pulsed output from the photocell is amplified as at 133 and then transmitted to the counter 131. Each increment of distance of belt travel accomplished by the drive motor 41 accordingly gives rise to a signal pulse input to the counter 131, so that the count accumulated in he counter 131 accurately represents the distance of belt travel and thus of the length of wire fed. Conveniently, the aperture spacing on wheel 59 may be made such that each pulse represents one-tenth inch of belt travel, in which case the counter setting indicators will read directly in inches and tenths.

In addition to its contacts $C_1$ in the motor-drive circuit the switch controlled by counter 131 includes two other sets of contacts $C_2$ and $C_3$. Contacts $C_2$ serve to enable the cut and strip operation; contacts $C_3$ serve to actually initiate that operation when the count called for by the manual of N/C setting has been reached, indicating completion of feed of the required length of wire and readiness for cut and strip. To perform such enabling function the switch contacts $C_2$ are closed when the drive motor is energized, and they then complete a circuit through the normally closed LS-OUT switch 129 to the coil of a relay K thus energizing that relay and causing it to latch on through its contacts $K_1$. At the same time contacts $C_3$ open, so that even though contacts $K_2$ now close due to energization of relay K there is no voltage supply to a second relay $K^1$ at this time. The cut and strip actuation mechanism, which is controlled by relay $K^1$, accordingly does not yet begin its operation.

When the wire feed operation is completed, counter 131 responds to the full count thus accomplished by throwing switches $C_1$–$C_3$ to the positions illustrated, thus stopping the motor and completing circuit through contacts $C_3$ and contacts $K_2$ to energize relay $K^1$, which then latches on through its contacts $K_1^1$. Contacts $K_2^1$ close and thereby energize a solenoid 135 which controls a spool valve 127 for the cutter actuators 79. After these actuators have driven the cutting heads together, severing the wire and insulation, limit switch 99 is tripped in the manner previously explained, closing the contacts designated LS-CUT in FIG. 4. This energies second solenoid 139 which operates through a second spool valve 141 to energize the clamp actuators 111. Upon completion of their movement, the clamp assemblies trip the limit switch 119, designated LS-CLAMP in FIG. 4, thus energizing a third solenoid 143 which operates through spool valve 145 to drive the strip actuators 95 and 115 through their strip and eject operation.

When these latter actuators reach the limit of their travel, the limit switch 129, designated LS-OUT in FIG. 4, is caused to open in the manner previously described and this breaks the voltage supply to relays K and $K^1$ thus deenergizing both relays and restoring their contacts to the positions illustrated. This completes an operating cycle and the system then is ready for the next cycle which again would be initiated by depression of the START button on electronic counter 131, causing drive motor 141 to feed another length of wire and enabling the cut and strip operation to come by energizing latching relay K.

It will be appreciated that if many pieces of wire are to be cut to the same length, the START operation may be made automatic to repetitively feed out any desired number of leads of identical length, by lead. recycling automatically on completion of feed of each lead. It will also be appreciated that by virtue of the first-piece accuracy afforded by the automatic cut and strip apparatus of this invention the apparatus lends itself to direct interfacing with N/C equipment particularly in applications in which the lengths of wire to be cut may vary from piece to piece in accordance with the dictates of an N/C input.

While the invention has been described in a preferred embodiment it will be appreciated that many modifications to the apparatus described may be made by those skilled in the art without departing from the spirit of the invention. In one such modification, for example, the individual actuators which are provided for translating the cutter and ejector carriages in the embodiment illustrated may be replaced with a single actuator of longer stroke coupled directly to the ejector carriage and through a lost motion device to the cutter carriage, with travel of this latter carriage limited by fixed stop means to about half that of the ejector carriage to thus provide the differential motion of the two carriages needed for the stripping operation.

What is claimed as new and desired to be secured by Letters Patent of the United States is:

1. Apparatus for cutting insulated electrical wire to desired length and stripping insulation from the cut ends, comprising:
   a. wire transport means including a pair of endless belts and means mounting said belts for linear travel over substantial portions of their lengths adjacent each other and with said wire engaged therebetween;
   b. means for loading said belts together and against said wire including a stationary backing member providing a first extended bearing surface against which slides one of said belts and a movable loading member providing a second extended bearing surface which is disposed in opposed relation to said first bearing surface and against which the other of said belts slides, and spring means operative against said loading member urging it in he direction of said backing member to load said belts between the opposed earing surfaces thereof;
   c. motor means for driving at least one of said belts to effect feed of wire in the direction of belt travel;
   d. wire and insulation cutter means selectively operable to sever the wire after feed through said wire transport means and to cut the wire insulation on either side of the plane of severance;
   e. stripping and ejector means selectively operable to strip he cut insulation from the adjacent wire ends and to discharge the wire thus stripped; and
   f. means for sensing belt travel and measuring distance of belt travel to thereby provide a measure of he length of wire fed.

2. Apparatus as defined in claim 1 wherein said wire and cutter means comprises first carriage means translatable in the direction of wire feed, wherein said stripping and ejector means comprises selectively operable clamp means mounted to second carriage means translatable in the direction of wire feed, and further including actuator means for reciprocating said first and second carriage means through a distance which for said second carriage means is approximately twice that for said first carriage.

3. Apparatus for cutting insulated electrical wire to desired length and stripping insulation from the cut ends, comprising:
   a. wire feed means including motor means and transport means driven thereby to effect feed of wire in given direction of travel and to hold said wire against travel in said direction except when said motor means is energized;
   b. wire and insulation cutter means including cutter heads carrying blades for severing the wire and cutting he insulation on either side of the plane of severance, actuator means selectively operable to drive said heads together to accomplish their cutting function, and first carriage means mounting said cutter heads and actuator means for translation along said direction of wire travel;
   c. stripping and ejector means including clamp members for grasping said wire on the side of the cuts in the wire and insulation remote from said feed means, actuator means selectively operable to drive said clamp members together to grasp the wire therebetween, and second carriage means mounting said clamp members nd actuator means for translation along said direction of wire travel;
   d. carriage drive means selectively operable to reciprocate said first carriage means through a first distance and to reciprocate said second carriage means through a second distance greater than said first distance by at least the length of insulation to be stripped; and
   e. control means for maintaining said cutter and clamp actuators in their respective cut and clamp positions during translation of said first and second carriage means in he direction of wire travel to thereby strip the insulation from both ends of the wire.

4. Apparatus as defied in claim 3 including a base member to which said wire feed means is mounted, and wherein said carriage drive means comprises a first linear actuator coupled between said base member and said first carriage means, and a second linear actuator coupled between said first and second carriage means for effecting said greater distance of translation of the latter carriage means.

5. Apparatus as defined in claim 3 herein said wire transport means comprises a pair of endless belts and means mounting said belts for liner travel over substantial portions of heir lengths adjacent each other and with said wire engaged therebetween during both feed and cut and strip operations.

6. Apparatus as defined in claim 5 wherein said motor means comprises a synchronous stepping motor providing a braking effect operative to restrain said belts against travel except when the motor is energized for wire feed.